UNITED STATES PATENT OFFICE 2,083,795

PRODUCTION OF HYDROGEN

Georg Schiller and Gustav Wietzel, Mannheim, Germany, assignors to I. G. Farbenindustrie Aktiengesellschaft, Frankfort-on-the-Main, Germany No Drawing. Application April 17, 1933, Serial No. 666,539

7 Claims. (Cl. 23—212)

The present invention relates to the production of hydrogen by the interaction of hydrocarbons and gases comprising hydrogen such as steam.

It has already been proposed to produce hydrogen by the conversion of hydrocarbons with gases comprising oxygen, such as steam, carbon dioxide or free oxygen in the presence of catalysts prepared by distributing nickel on magnesia which was before formed to pieces and burnt. Catalysts have also been suggested for this purpose which were prepared by pasting up magnesite with up to 10 per cent of nickel nitrate and with water, drying and roasting the resulting mass, and then, after moistening, pressing it to shaped pieces, as for example Raschig rings. These catalysts, however, promote the said conversion of hydrocarbons with steam only at relatively high temperatures. In order to effect with the said catalysts a sufficiently rapid and complete conversion of, for example, methane, temperatures between about 800° and 1000° C. are necessary whereas with other known catalyst compositions conversion takes place already at 650° C. Compared with these compositions the aforesaid catalysts containing nickel and magnesia have the advantages that they are very stable and keep the volume filled by them even at very high temperatures. Furthermore only small amounts of carbon black are formed in the conversion of higher molecular hydrocarbons when employing the said catalysts which retain their activity unchanged for a long time.

We have now found that when preparing the catalysts containing nickel and magnesia while observing certain precautions their activity is so considerably enhanced as compared with nickel-magnesia-catalysts prepared as hitherto usual that they promote the aforesaid conversion as well as the most effective catalytic mixtures composed of other constituents without their other favorable qualities being reduced in any way.

In order to attain this it has been found that it is necessary to employ catalysts having a relatively high content of nickel. Good results are obtained with catalysts containing between 10 and 40 per cent, preferably between 20 and 30 per cent of nickel, the remainder being essentially composed of magnesium oxide.

The said catalysts are prepared according to the present invention by mixing a fine dispersion of a nickel salt in water with a compound of magnesium, preferably magnesium oxide, converting this mixture into a mixture of the oxides of nickel and magnesium and reducing the nickel oxide.

The aforesaid fine dispersion of a nickel salt in water may either be a solution of a nickel salt in water, or the melt of a water-soluble nickel salt containing crystal water, or a freshly precipitated water-insoluble nickel salt, preferably nickel hydroxide or carbonate, containing water.

As nickel salts, which expression is to include also nickel hydroxide, those come into question, which upon heating up to 600° C. are completely decomposed, i. e. converted into nickel oxide or metallic nickel, as for example in the case of nickel formate. As magnesium compounds those are employed which upon heating up to 600° C. leave behind magnesium oxide, which definition of course also includes magnesium oxide itself as the initial compound.

The subsequent conversion of the aforedescribed mixture of a compound of magnesium and a fine dispersion of a nickel salt with water into the oxides of nickel and magnesium may be effected in different ways. When starting from the nitrates of nickel and magnesium, these may be dissolved in water, then precipitated by a suitable agent, as for example a soda solution or solutions of other soluble carbonates or hydroxides, and thereupon subjected to roasting. Again the said mixtures of the oxides of nickel and magnesium may also be prepared by roasting the melt of a mixture of water-soluble nickel and magnesium salts containing crystal water. Or a solution of a nickel salt may be added to magnesium oxide whereupon the whole is subjected to roasting, or a freshly precipitated water-insoluble nickel salt containing water is allowed to act upon magnesium oxide (which preferably has not been exposed to temperatures above 1000° C.), whereby a conversion according to the equation

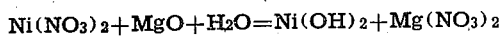

$$Ni(NO_3)_2 + MgO + H_2O = Ni(OH)_2 + Mg(NO_3)_2$$

takes place, whereupon the resulting mixture is roasted. The desired compositions may also be obtained by starting from nickel oxide or dry nickel carbonate, adding acids effecting a dissolution of these compounds and thereupon proceeding in one of the aforedescribed ways. It is not preferable to start with chlorides or sulphates since these are not completely converted into the corresponding oxides by heating up to 600° C.

It is sufficient to mix only a part of the magnesia or a magnesium compound yielding the same with the nickel before converting the nickel salt into nickel oxide; the remainder may be subsequently added in another form, as for example as magnesia burnt at high temperatures, to the material comprising nickel and mixed therewith mechanically. Also, the final mixture of nickel and magnesium compounds may be highly heated before further working up in order to increase the capacity of the catalysts for maintaining their volume at high temperatures.

The further working up is effected as usual. The mixture of the nickel and magnesium oxides from which the volatile constituents, such as water, carbon dioxide and oxides of nitrogen, have been removed by heating is moistened with a sufficient amount of water and then pressed at a respectably high pressure to form suitably shaped pieces. These pieces may then be subjected to a reducing treatment, which, however, may also be effected during the conversion of the hydrocarbons in which hydrogen is formed, so that the said pressed pieces represent the ready-made catalysts. The reducing treatment may also be included in the conversion of the initial compounds of nickel and magnesium, as for example by starting from a solution of nickel formate and simple heating in the presence of the magnesium compound. The said pieces promote even at a temperature as low as 650° C. the said conversion of gaseous hydrocarbons with steam into oxides of carbon and hydrogen as well as the conversion of hydrocarbons with carbon dioxide or with gases comprising free oxygen or with several of these agents into mixtures of carbon monoxide and hydrogen. The aforesaid gaseous agents, such as steam, carbon dioxide, gases comprising free oxygen are hereinafter collectively called gases containing oxygen which are capable of reacting with carbon with the formation of carbon monoxide.

The following examples will further illustrate the nature of the present invention; the invention is, however, not restricted to the particular operations described in these examples.

*Example 1*

150 parts by weight of crystalline nickel nitrate are melted in the crystal water whereupon 40 parts by weight of magnesia free from sulphur are introduced into the melt, a vigorous reaction thereby taking place. The resulting paste is roasted at a temperature between 400° and 500° C. until the nitrates are decomposed whereupon the mixture is ground to a fine powder. This powder is mixed with about 50 parts by weight of magnesia and 30 parts of water, the resulting mass then being pressed by a pressure of about 300 kilograms per square centimeter to form tablets or other shaped pieces. In this manner a catalyst having an extraordinary stability is obtained.

*Example 2*

Basic nickel carbonate is precipitated by means of soda from a solution of nickel nitrate, the precipitate then being sucked off and washed out. 250 parts by weight of the still wet mass containing 10 per cent of nickel is thereupon thoroughly kneaded with 25 parts of a reactive magnesia and the resulting paste is dried. After roasting at about 400° C. the pulverized product is mixed with 40 parts by weight of magnesia which is previously heated to 1200° C. and then ground. The mixture is moistened with 30 parts of water and formed to shaped pieces as described in Example 1. The resulting catalyst is suitable also for the conversion of higher molecular hydrocarbons than methane. If for example 135 liters of a gas mixture consisting of 70 per cent of propane, 25 per cent of butane and 5 per cent of propylene is passed at about 700° C. over 1 liter of the said catalyst together with thrice the amount of steam stoichiometrically required for the conversion of the hydrocarbons into carbon monoxide and hydrogen, a gas is obtained consisting of about 16 per cent of carbon dioxide, 75 per cent of hydrogen, 6 per cent of carbon monoxide, 1 per cent of methane and 2 per cent of nitrogen. No formation of carbon black can be observed even after working for 6 days.

*Example 3*

500 parts by weight of nickel nitrate and 500 parts by weight of magnesium nitrate are dissolved in water and precipitated with the stoichiometrically necessary amount of soda. The precipitate is dried and heated to 400° C. The finely pulverized product is mixed with 150 parts of burnt magnesia and 150 parts of water, whereupon the mixture is pressed to small cylinders. With this catalyst similar results are obtained as with those prepared as described in the foregoing examples.

What we claim is:—

1. A process for the production of hydrogen by conversion of a gaseous hydrocarbon with a gas comprising an oxidizing agent of the group consisting of steam, carbon dioxide and free oxygen, which comprises reacting said gaseous hydrocarbon with the said gas at a temperature between 500° and 900° C. in the presence of a catalyst containing from 10 to 40 per cent of nickel and from 90 to 60 per cent of magnesium oxide and which is prepared by mixing a compound of magnesium leaving behind magnesium oxide by heating up to 600° C. with a fine dispersion in water of a nickel salt which upon heating up to 600° C. is completely decomposed, said magnesium compound being employed in an amount less than that corresponding to the aforesaid ratio of nickel and magnesium oxide, converting the resulting mixture into a mixture of the oxides of nickel and magnesium adding magnesium oxide to the mixture in such an amount that the aforesaid ratio is established and then subjecting these oxides to a reducing treatment, thereby converting the nickel oxide into metallic nickel.

2. A process for the production of hydrogen by conversion of a gaseous hydrocarbon with a gas comprising oxygen which is capable of reacting with carbon with the formation of carbon monoxide, which comprises reacting said gaseous hydrocarbons with the said gas at a temperature between 500° and 900° C. in the presence of a catalyst containing from about 20 to 40 per cent of nickel and from about 80 to 60 per cent of magnesium oxide based on the gross weight and which is prepared by mixing a compound of magnesium leaving behind magnesium oxide by heating up to 600° C. with a fine dispersion in water of a nickel salt which upon heating up to 600° C. is completely decomposed, converting the resulting mixture, containing a nickel salt or nickel hydroxide, before contacting said catalyst with the said gaseous hydro-carbons, by roasting into a mixture of the oxides of nickel and magnesium, shaping these oxides by pressing and then subjecting the pressed oxides to a reducing treatment, thereby converting the nickel oxide into metallic nickel.

3. A process for the production of hydrogen by conversion of a gaseous hydrocarbon with a gas selected from the group consisting of steam, carbon dioxide and gases comprising free oxygen, which comprises reacting said gaseous hydrocarbon with said gas at a temperature between 500° and 900° C. in the presence of a catalyst containing from 20 to 40 per cent of nickel and from 80 to 60 per cent of magnesium oxide based on the gross weight and which is prepared by mixing a compound of magnesium leaving behind magnesium oxide by heating up to 600° C. with a fine dispersion in water of a nickel salt which upon heating up to 600° C. is completely decomposed, converting the resulting mixture, containing a nickel salt or nickel hydroxide, before contacting said catalyst with the said gaseous hydro-carbons, by roasting into a mixture of the oxides of nickel and magnesium, shaping these oxides by pressing and then subjecting the pressed oxides to a reducing treatment, thereby converting the nickel oxide into metallic nickel.

4. A process for the production of hydrogen by conversion of a gaseous hydrocarbon with steam, which comprises reacting said gaseous hydrocarbon with the steam at a temperature between 500° and 900° C. in the presence of a catalyst containing from about 20 to 40 per cent of nickel and from about 80 to 60 per cent of magnesium oxide based on the gross weight and which is prepared by mixing a compound of magnesium leaving behind magnesium oxide by heating up to 600° C. with a fine dispersion in water of a nickel salt which upon heating up to 600° C. is completely decomposed, converting the resulting mixture, containing a nickel salt or nickel hydroxide, before contacting said catalyst with the said gaseous hydro-carbons, by roasting into a mixture of the oxides of nickel and magnesium, shaping these oxides by pressing and then subjecting the pressed oxides to a reducing treatment, thereby converting the nickel oxide into metallic nickel.

5. A process for the production of hydrogen by conversion of a gaseous hydrogen witht a gas comprising an oxidizing agent of the group consisting of steam, carbon dioxide and free oxygen, which comprises reacting said gaseous hydrocarbon with the said gas at a temperature between 500° and 900° C. in the presence of a catalyst containing from 20 to 40 per cent of nickel and from 80 to 60 per cent of magnesium oxide and which is prepared by mixing a compound of magnesium leaving behind magnesium oxide by heating up to 600° C. with a fine dispersion in water of a nickel salt which upon heating up to 600° C. is completely decomposed, said magnesium compound being employed in an amount less than that corresponding to the aforesaid ratio of nickel and magnesium oxide, converting the resulting mixture into a mixture of the oxides of nickel and magnesium, adding magnesium oxide to the mixture in such an amount that the aforesaid ratio is established and then subjecting these oxides to a reducing treatment, thereby converting the nickel oxide into metallic nickel.

6. A process for the production of hydrogen by conversion of a gaseous hydrocarbon with a gas comprising an oxidizing agent selected from the group consisting of steam, carbon dioxide and free oxygen, which comprises reacting said gaseous hydrocarbon with the said gas at a temperature between 500° and 900° C. in the presence of a catalyst containing from about 20 to 30 per cent of nickel and from about 80 to 70 per cent of magnesium oxide based on the gross weight and which is prepared by mixing a compound of magnesium, leaving behind magnesium oxide by heating up to 600° C. with a fine dispersion in water of a nickel salt which upon heating up to 600° C. is completely decomposed, converting the resulting mixture, before being contacted with the said gaseous hydrocarbon, into a mixture of the oxides of nickel and magnesium, bringing this mixture into a desired form by pressing, and then subjecting these oxides to a reducing treatment, thereby converting the nickel oxide into metallic nickel.

7. A process for the production of hydrogen by conversion of a gaseous hydrocarbon with a gas comprising an oxidizing agent selected from the group consisting of steam, carbon dioxide and free oxygen, which comprises reacting said gaseous hydrocarbon with the said gas at a temperature between 500° and 900° C. in the presence of a catalyst containing from about 20 to 40 per cent of nickel and from about 80 to 60 per cent of magnesium oxide based on the gross weight and which is prepared by mixing a compound of magnesium leaving behind magnesium oxide by heating up to 600° C. with a fine dispersion in water of a nickel salt which upon heating up to 600° C. is completely decomposed, converting the resulting mixture, before being contacted with the said gaseous hydrocarbon, into a mixture of the oxides of nickel and magnesium, bringing this mixture into a desired form by pressing, and then subjecting these oxides to a reducing treatment, thereby converting the nickel oxide into metallic nickel.

GEORG SCHILLER.
GUSTAV WIETZEL.